United States Patent [19]
Böhm et al.

[11] Patent Number: 5,141,826
[45] Date of Patent: Aug. 25, 1992

[54] HIGH-ENERGY BATTERY WITH A TEMPERATURE REGULATING MEDIUM

[75] Inventors: Harald Böhm, Glashütten; Gerd Beyermann, Dietenheim; Markus Bulling, Biberach, all of Fed. Rep. of Germany

[73] Assignee: Licentia Patent-Verwaltungs GmbH, Frankfurt, Fed. Rep. of Germany

[21] Appl. No.: 763,435

[22] Filed: Sep. 20, 1991

[30] Foreign Application Priority Data

Sep. 21, 1990 [DE] Fed. Rep. of Germany ....... 4029901

[51] Int. Cl.$^5$ .......................................... H01M 10/50
[52] U.S. Cl. ...................................... 429/120; 429/26
[58] Field of Search ................. 429/120, 26, 104, 62; 165/104.33, 104.34, 97

[56] References Cited

U.S. PATENT DOCUMENTS

| | | | |
|---|---|---|---|
| 4,522,898 | 6/1985 | Esrom | 429/120 |
| 4,578,324 | 3/1986 | Koehler et al. | 429/26 |
| 4,706,737 | 11/1987 | Taylor et al. | 429/120 X |
| 4,865,929 | 9/1989 | Eck | 429/120 |

*Primary Examiner*—Anthony Skapars
*Attorney, Agent, or Firm*—McGlew & Tuttle

[57] ABSTRACT

In a high-energy battery with a plurality of individual cells in a housing through which a coolant flows, it is suggested that the coolant be guided such that it thermally affects only one or both end faces of the cells.

11 Claims, 6 Drawing Sheets

HIGH-ENERGY BATTERY WITH A TEMPERATURE REGULATING MEDIUM

FIELD OF THE INVENTION

The present invention pertains to a high-energy battery for high operating temperatures (e.g. $Na/NiCl_2$ or $Na/S$ batteries operating at temperatures between 250° C. and 400° C.) with a plurality of cells arranged next to one another in a housing and with a liquid or gaseous medium flowing within the housing to influence the temperature of the individual cells.

BACKGROUND OF THE INVENTION

High-energy batteries, e.g., $Na/NiCl_2$ or $Na/S$ batteries, operate at temperatures between 250° C. and 400° C. These batteries are composed of individual tubular cells. The individual cells of one battery are to be maintained at the same temperature in order for the internal resistances of the cells to be the same. Different internal resistances would lead to different loads on the individual cells and consequently to different states of charge and discharge of the cells. Nonuniformities in the states of charge within the battery may lead to a reduction of the service life of the battery.

During a discharge cycle of such batteries, the inner areas of the battery in particular are heated more strongly than the outer ones, because heat dissipates via the housing. During charging, the cells which are arranged closest to the electric heater in particular have a higher temperature than the cells that are located at a greater distance.

The internal resistance leads to evolution of heat within the battery during discharge. This can be explained on the basis of the example of a 27 kWh battery with a voltage of 150 V and a capacity of 180 Ah: During a 2-hour discharge, i.e., discharge with a current of 90 A, it is necessary to continuously remove a waste power of ca. 2 kW. Part of the power loss can be accommodated by the thermal capacity of the battery, and the rest must be removed from the battery by means of a cooling system.

For example, various possibilities of cooling such batteries are described in the documents German Offenlegungsschriften Nos. DE-OS 32,47,969, 26,10,222, and 28,35,550. It is common to all these suggestions that the coolant sweeps past along the cells, and the heat is thus exchanged on the entire surface of the cell. These arrangements make little contribution to achieving temperature equalization between the individual cells of the battery. The temperature equalization, which takes place only very slowly, leads to nonuniform loads. Another disadvantage of these cooling devices is their complicated nature. For example, a special distribution system is installed in the battery according to the application in order to achieve uniform guidance of air along the cells. The distribution of air within the individual canals between the cells cannot be accurately calculated and must be optimized experimentally. If the conditions change within the battery (e.g., due to a change in the removal of heat via the walls of the battery), the air distribution must again be optimized in order to again ensure uniform temperature distribution. It is also necessary to redesign the geometry, e.g., of a distributor plate, each time the design is changed.

SUMMARY AND OBJECTS OF THE INVENTION

It is an object of the present invention is to provide a battery of the type described in the introduction, in which the heat due to energy losses is removed during the discharge of the battery and a uniform temperature distribution is guaranteed within the battery over all cells during charging, idling, and discharge, and which can be simply adapted to altered battery geometries.

According to the invention, a high-energy battery such as a sodium based battery (e.g., $Na/NiCl_2$ or $Na/S$ batteries operating at temperatures between 250° C. and 400° C.) is provided including a plurality of cells arranged next to one another in a housing and with a liquid or gaseous medium flowing within the housing to influence the temperature of the individual cells. The housing is provided with means for guiding the medium within the housing such that one or both of the two ends of the cells are brought directly or indirectly into heat-exchanging contact with the medium for influencing the temperature.

The invention provides the battery cells and the housing such that top and bottom ends are positioned such that one or both of the ends are exposed to the temperature regulating medium and such that the temperature regulating medium does not substantially influence the side walls of the cells, wherein the side walls of adjacent cells are positioned facing each other.

It was surprisingly found in experiments that the heat due to energy losses does not need to be removed over the entire surface of the tubular cell, but it is fully sufficient for the coolant or the medium used for temperature equalization to flow through only one or both ends of the tubular cell. The task is accomplished according to the present invention by the medium for removing the heat or equalizing the temperature flowing only around the upper and/or lower end of the tubular individual cell.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
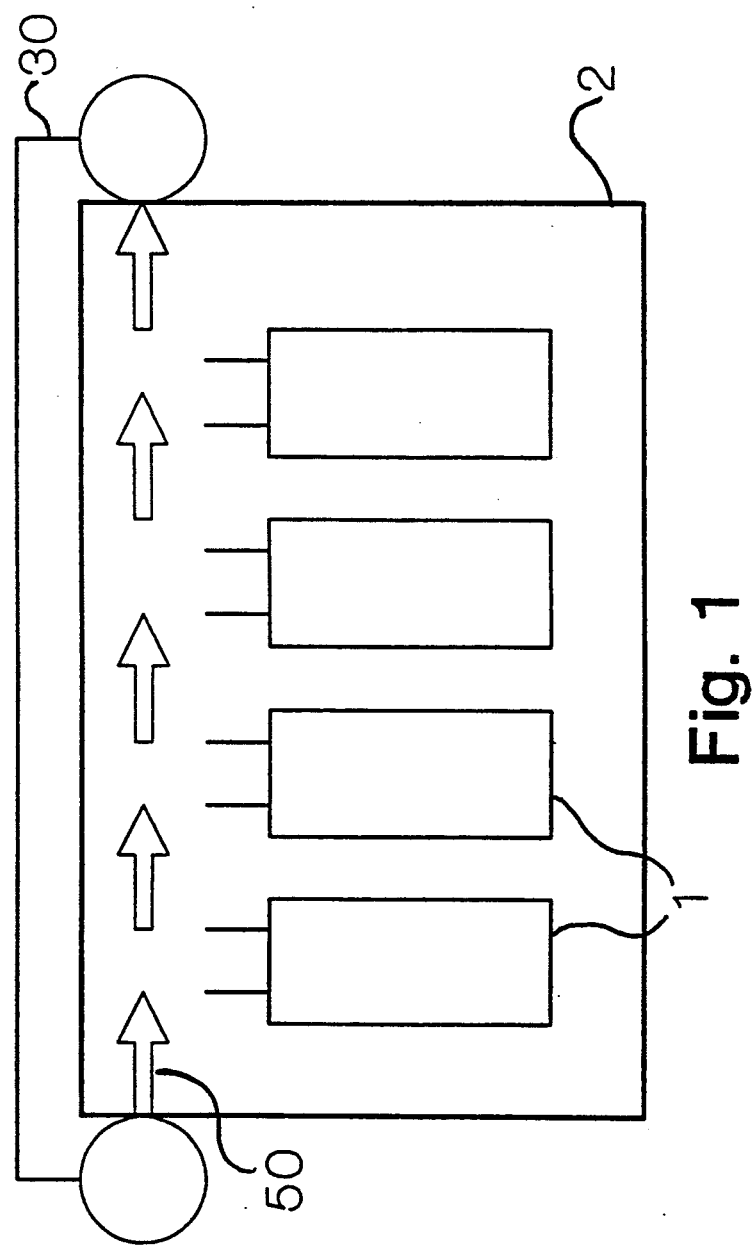
FIG. 1 is a schematic view of the high-energy battery according to the invention.

Referring to the drawings in particular the invention embodied therein comprises a battery provided by individual sodium cells 1 (i.e., $Na/NiCl_2$ or $Na/S$ battery cells operating at temperatures between 250° C. and 400° C.) which are positioned within a housing 2 wherein the housing cooperates with guide means 50 for generating and guiding a temperature influencing flow. The battery shown in a simplified manner has only 8 individual cells 1, which stand upright and are arranged in two rows of four cells each arranged next to one another within the housing 2. The arrows shown indicate the directions of flow of the medium controlling the desired temperature. The housing is designed as a thermally insulating housing in the known manner. The cells 1 are preferably designed as cylindrical cells.

In this high-energy battery with cylindrical cells which are packed densely, a power loss of ca. 2 kW is generated during a 2-hour discharge at a storage capacity of 27 kWh. This power loss is generated over the entire volume of the individual cell. The heat that is generated due to the power loss must be removed in order for the battery temperature not to rise uncontrollably. This can be achieved simply by placing the cells into a rectangular battery box and blowing the air over the cells from one end to the other in the longitudinal direction (FIG. 1) using a medium guide means in the form of a blower 20. In this arrangement, the cells are cooled more intensely at the air inlet than at the outlet. To remove the 2 kW, an air flow rate of $<50$ m$^3$/hour is required. It is assumed that the air temperature increases by ca. 150° K from the inlet to the outlet.

Figure 2:
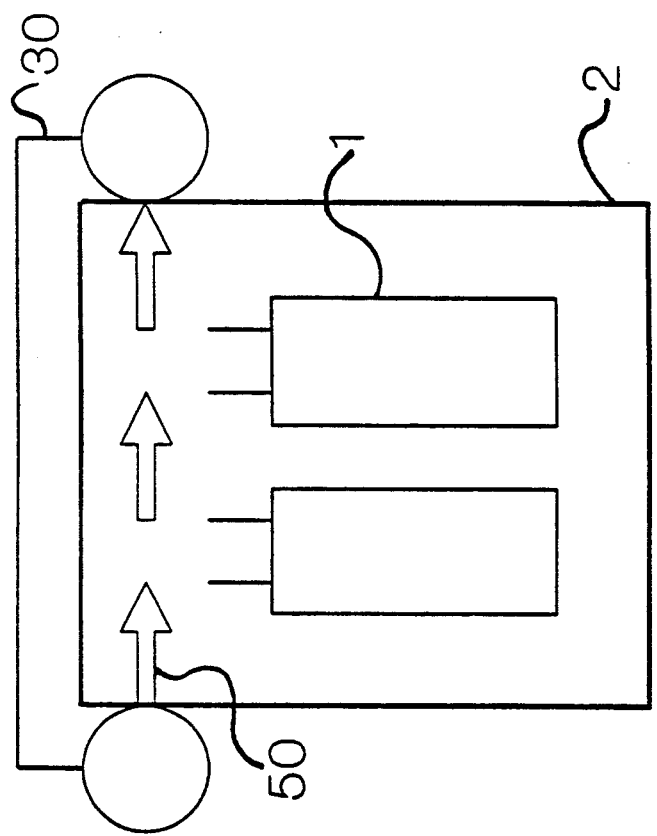
FIG. 2 is a second embodiment of the high-energy battery according to the invention.

The temperature difference between the inlet side and the outlet side can be reduced by causing the air to flow through the battery in the transverse direction rather than in the longitudinal direction (FIG. 2).

An even more uniform temperature distribution can be achieved by causing the air to enter in the lower part of the battery on one side and to leave it in the upper part on the same side, or vice versa. The air is now guided over the cell packet in such a form that the air is sent under the cells to the end of the battery, then in the upward direction on the rear side, and to the inlet side over the cell packet (FIG. 3), or vice versa. The jacket surfaces of the cells 2 are preferably insulated against thermal contact with the ascending and descending medium in order to ensure that these rear cells are also thermally affected by the medium only at their ends. On the inlet side, the cells are cooled more intensely on the underside, because the temperatures of the air and the coolant are the lowest here. These cells are cooled less intensely on the top side, because the air already has a higher temperature here. Extensively uniform heat removal over all cells is achieved by this air guidance.

Figure 3:
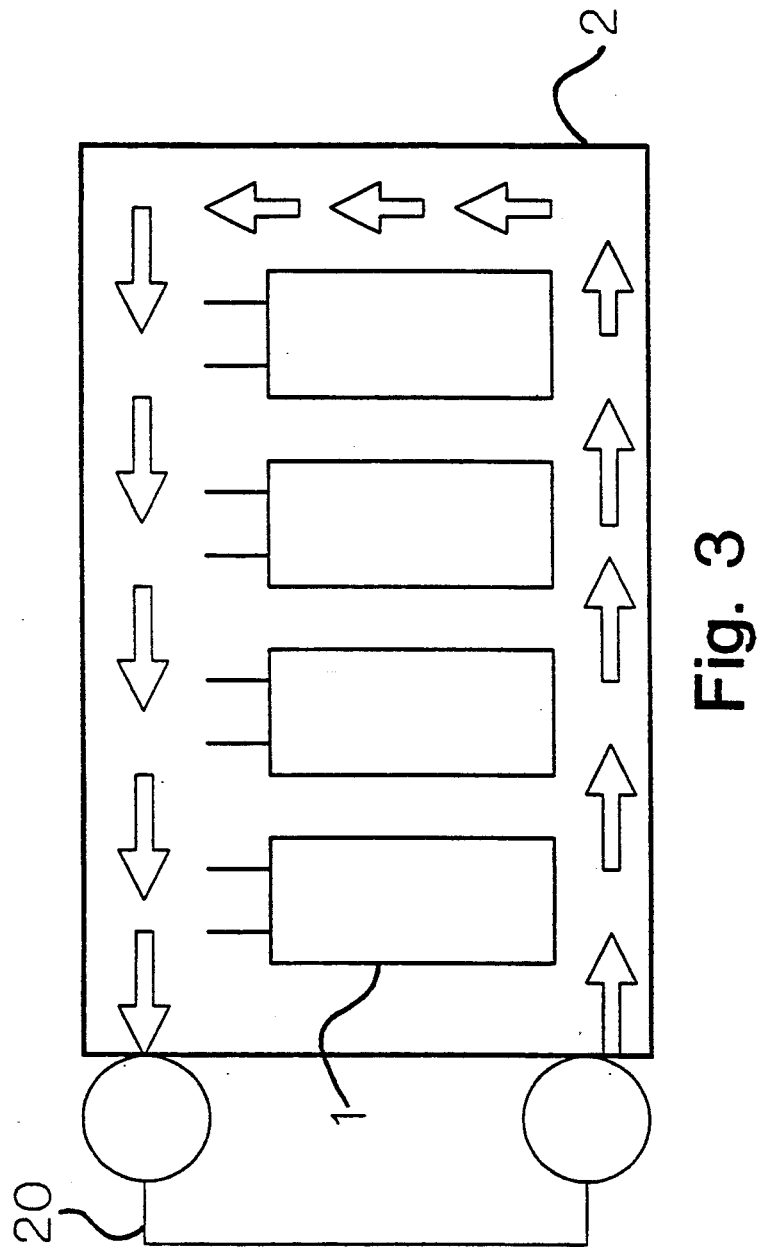
FIG. 3 is still another embodiment of the high-energy battery according to the invention.

In the case of the types of air guidance shown in FIGS. 1 through 3, extensively uniform flow is achieved under and above the cells. The design of a battery with this air guidance is relatively simple, because space for air guidance need be provided only beneath of the cell packet and in the rear part of the battery, preferably over the entire width of the battery. Due to the design, a space is available above the cells, so that the medium is able to sweep over the cells. The principle of this cooling can also be adapted to various battery geometries as desired, i.e., a coolant can thus be admitted even into quadratic batteries or very long batteries in a simple manner.

Figure 4:
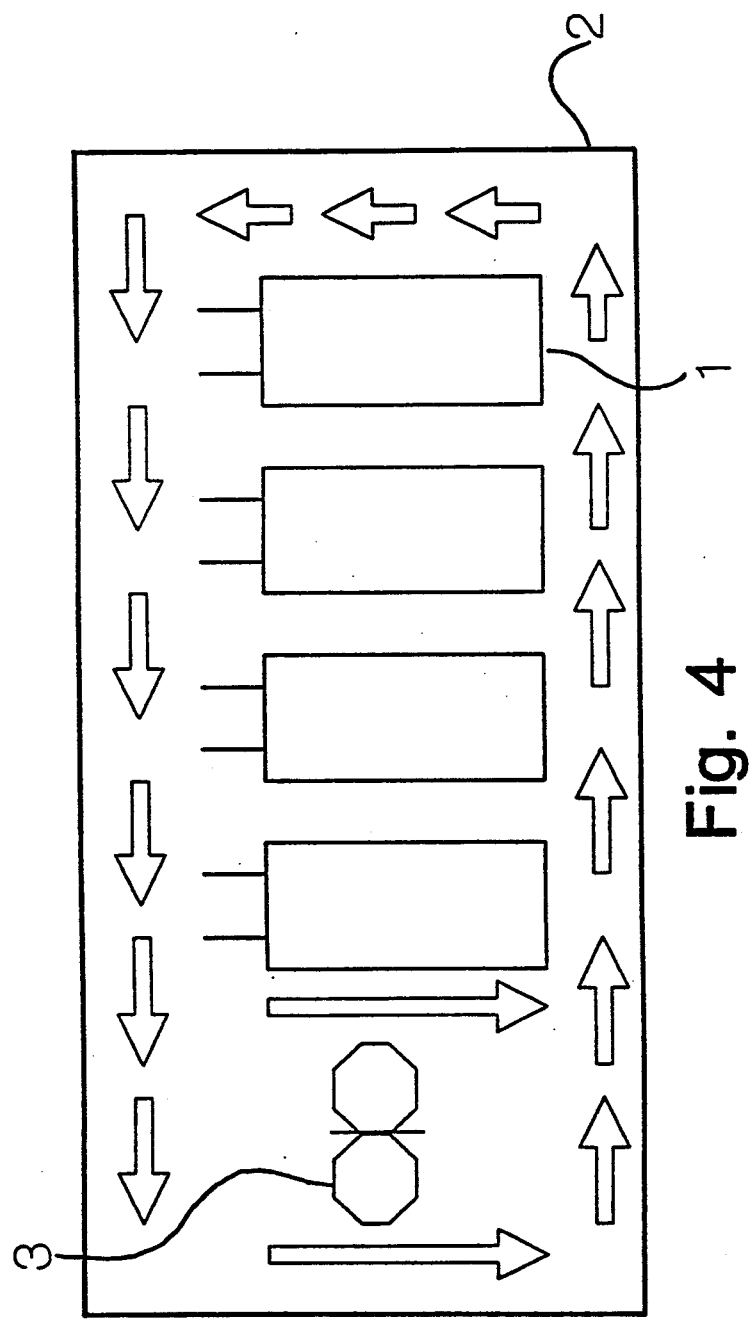
FIG. 4 is yet another embodiment of the high-energy battery according to the invention.

A comparable type of guidance of the coolant can also be used for temperature equalization within the battery. As was mentioned above, it is important for all cells of one battery to be at the same temperature level. This is achieved according to the present invention not by exchanging the medium, as is done in the case of cooling, but by circulating the medium in a closed cycle within the battery. Based on the example of a rectangular battery housing, e.g., the following procedure is followed (FIG. 4): Using a blower 3, which is installed in the battery housing 2, the medium is caused to flow past under the cells, in the upward direction on the rear side, past the cells, and back to the blower on the front side, or vice versa. Thus, a closed cycle is obtained for the medium, which provides for temperature equalization within the battery.

Figure 5:
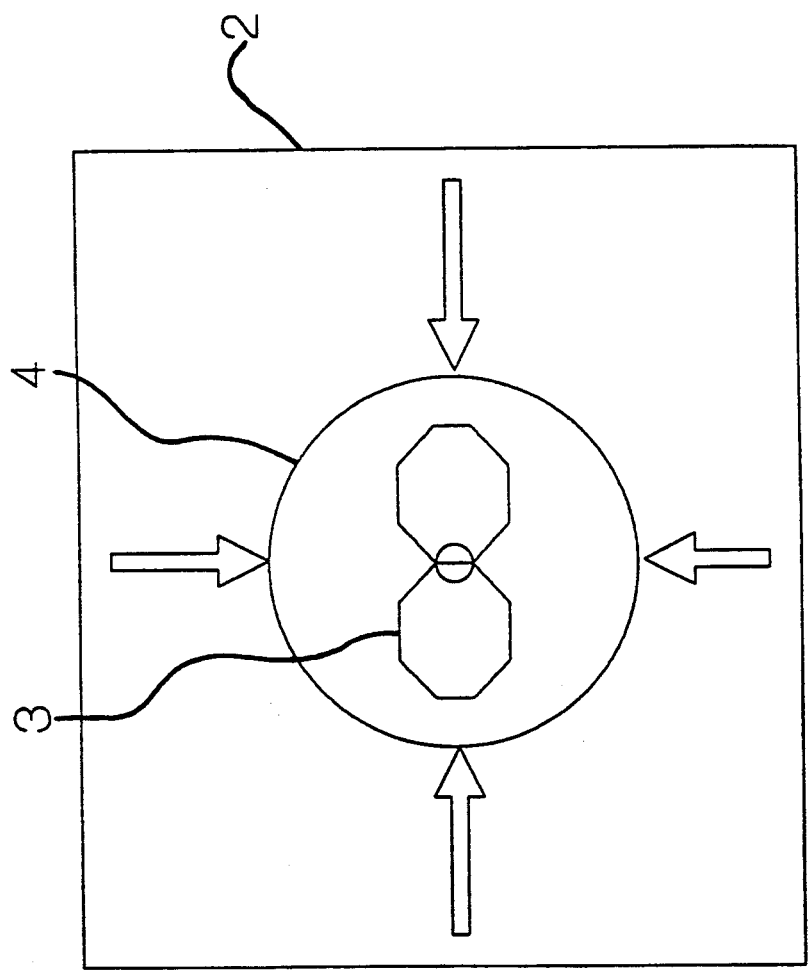
FIG. 5 is a top view of still another embodiment of the invention.
Figure 6:
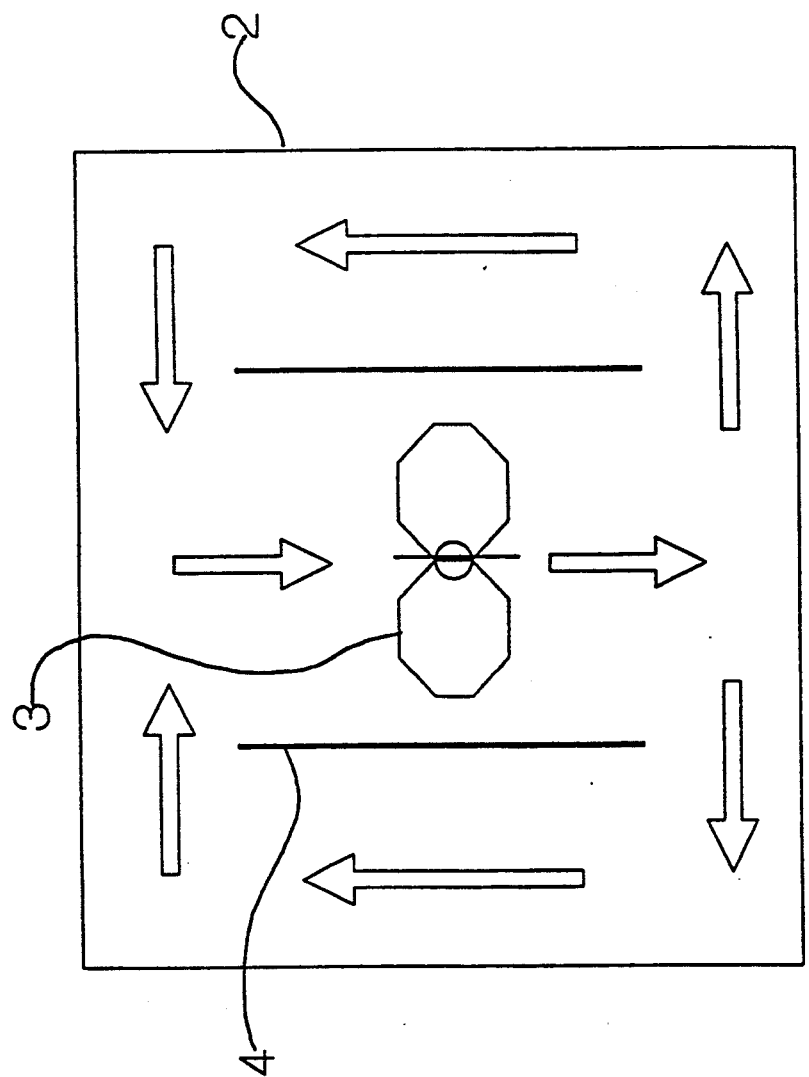
FIG. 6 is a side view of the embodiment shown in FIG. 5.

As was described above, this arrangement applies to cells arranged vertically in the housing. If the cells are arranged horizontally, the medium is guided on the side, so that the ends of the cells come into contact with the medium in this case as well, and are thus able to bring about cooling or temperature equalization. According to another embodiment, an arrangement according to FIGS. 5 and 6 has also proved to be useful. An empty tube 4 is arranged in the middle of the upright cell packet. A blower 3 is installed in said empty tube 4 or in its vicinity. Said blower 3—e.g., an impeller in this case—blows the medium through the empty tube, after which it is guided radially to the outside under the cell packet, upward on the sides, and back to said empty tube 4 with said blower 3 above the cells. Said blower may also be arranged such that it draws the medium through said empty tube, thus reversing the direction of circulation of the medium. This arrangement of the medium guidance has proved to be particularly advantageous in batteries with a more or less quadratic base.

High-energy batteries which operate at elevated temperatures must be reheated during the idling and charging periods in order to compensate for the heat dissipation via the housing. If these batteries have low discharge rates, i.e., discharges taking more than ca. 2 hours in order to discharge the entire capacity of the battery, little or no cooling is needed, but only an auxiliary heater is required in order to compensate for the heat dissipation via the housing. In this case, the heater may be arranged in the ascending medium flow, and the blower may be eliminated if desired. The medium is now circulated solely by convection.

In the case of more rectangular battery housings, which have no central empty tube, the heater is arranged either on a front side or on a side surface. This leads to the medium circulating around the cell packet. In the case of batteries which are provided with an empty tube which is located in the middle of the cell packet, the heater may be integrated within the empty tube, as a result of which the medium will rise in the empty tube and also circulate around the cell packet.

The devices provided to pass the medium for cooling or temperature equalization above or beneath the cells have also proved to be useful when two cell packets are arranged one on top of another, i.e., vertically standing cells in two planes. It is sufficient in this case to pass through the medium horizontally between the two packets in order to adequately cool the entire battery or to provide for adequate temperature equalization.

It should also be mentioned that the system described for cooling or temperature equalization in batteries is also suitable when cells with rectangular or other cross-sectional shapes rather than tubular cylindrical cells are used. The height of the cells also exerts a substantial effect. In the simplest case, air can be used as the medium. However, it is also possible to use liquid media, which are preferably located in a corresponding tube system.

The cells or the cell packets are now arranged standing on a cooling plate through which the medium flows, and another cooling plate, through which medium flows, may also additionally be arranged horizontally on the cell packet. To remove the heat, a heat exchanger is to be provided outside the battery, along with a pump, in order to transport the liquid medium through this tube/plate system. In the case of heat equalization brought about without a pump, the heater is arranged in the ascending part of the liquid system, i.e., on a front surface or on a side surface or in the central empty tube of the battery.

The ends of the cells are meant as the upper and lower end faces or front surface areas of the cells. The medium may be formed by gaseous and liquid substances. Gaseous substances, e.g., air, are generally preferable.

While a specific embodiment of the invention has been shown and described in detail to illustrate the application of the principles of the invention, it will be understood that the invention may be embodied otherwise without departing from such principles.

What is claimed is:

1. High-energy battery for high operating temperatures, the battery comprising: a housing; a plurality of cells arranged next to one another in said housing, the cells each having a first end and a second end and side walls; a liquid or gaseous medium flowing within the housing to influence the temperature of the individual cells; and guide means for guiding the medium within the housing and for directing the medium such that only one of said first end and second end or both said first end and second end of the cells are brought directly or indirectly into heat-exchanging contact with the medium.

2. High-energy battery in accordance with claim 1, wherein said cells are formed as cylinders.

3. High-energy battery in accordance with claim 1, wherein said guide means acts on the medium to affect only one end of the cells.

4. High-energy battery in accordance with claim 1, wherein said guide means acts on the medium to affect only the two opposite ends of the cells.

5. High-energy battery in accordance with claim 1 wherein said guide means acts on the medium directing the medium directly around the ends of the cells.

6. High-energy battery in accordance with claim 1 wherein said guide means acts on the medium to thermally affect the ends of the cells indirectly, i.e., via an electrically insulating material.

7. High-energy battery in accordance with the claim 1 wherein said guide means includes one flow canal, which is arranged in parallel to a longitudinal direction of the cells, and in which means for affecting the temperature and/or the flow velocity of the medium are arranged, said flow canal being provided within said housing.

8. High-energy battery in accordance with the claim 1 wherein said guide means includes openings provided in said housing which permit the flow and/or the temperature to be influenced outside the housing at least temporarily and the medium to be replaced.

9. High-energy battery in accordance with the claim 1 wherein said guide means provides the medium located in the housing in a closed cycle at least part of the time.

10. A high-energy sodium based battery for high operating temperatures, the battery comprising: a plurality of sodium cells, each cell being formed as a cylinder with side walls, and a top end and a bottom end, said cells being positioned within said housing to define an upper space adjacent top ends of said cells; a fluid medium within said housing for flowing within said housing to influence a temperature of the individual cells; and, fluid guide means for guiding the fluid medium within the housing for directing the fluid medium directly or indirectly into heat-exchanging contact with only said top surface of said cells.

11. A high-energy sodium based battery for high operating temperatures, the battery comprising: a plurality of sodium cells, each cell being formed as a cylinder with side walls, and a top end and a bottom end, said cells being positioned within said housing to define an upper space adjacent top ends of said cells and defining a lower space adjacent bottom ends of the cells; a fluid medium within said housing for flowing within said housing to influence a temperature of the individual cells; and, fluid guide means for guiding the fluid medium within the housing such that each of the top surface of each of said cells and the bottom surface of each of said cells is brought directly or indirectly into heat-exchanging contact with the medium.

* * * * *